W. DINGLE & W. JENKINS.

Said JENKINS assignor to A. F. WENDT.

STUFFING BOX.

No. 10,608. Reissued June 9, 1885.

WITNESSES

F. W. Rosenbaum.

Carl Kapp

INVENTORS

William Dingle and

William Jenkins

By their Attorneys

Gowen & Raegener

UNITED STATES PATENT OFFICE.

WILLIAM DINGLE AND WILLIAM JENKINS, OF LAKE MAHOPAC; SAID JENKINS ASSIGNOR TO ARTHUR F. WENDT, OF NEW YORK, N. Y.

STUFFING-BOX.

SPECIFICATION forming part of Reissued Letters Patent No. 10,608, dated June 9, 1885.

Original No. 306,230, dated October 7, 1884. Application for reissue filed May 11, 1885.

*To all whom it may concern:*

Be it known that we, WILLIAM DINGLE and WILLIAM JENKINS, of Lake Mahopac, in the county of Putnam and State New York, have invented certain new and useful Improvements in Stuffing-Boxes, of which the following is a full, clear, and exact description.

The object of this invention is to promote convenience and durability in the use of stuffing-boxes.

The invention consists of a stuffing-box having an enlarged end, a split gland guided in said enlarged end, and longitudinal bolts and nuts that connect the gland with the stuffing-box, so that the said gland can be readily applied and removed, as will be hereinafter fully described.

Reference is to be had to the accompanying drawings, forming a part of this specification, in which similar letters of reference indicate corresponding parts in all the figures.

Figure 1:
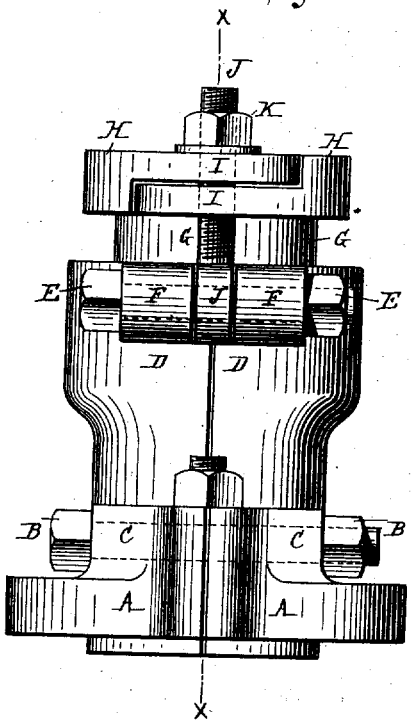
Figure 2:
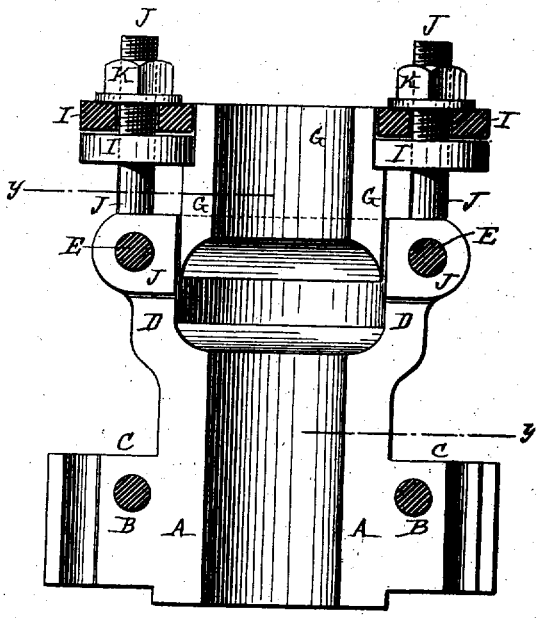
Figure 3:
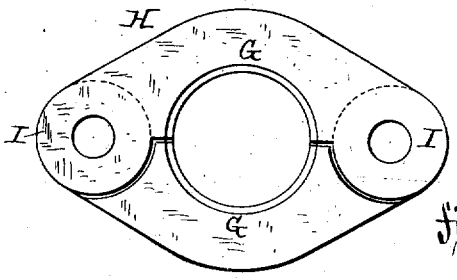
Figure 4:
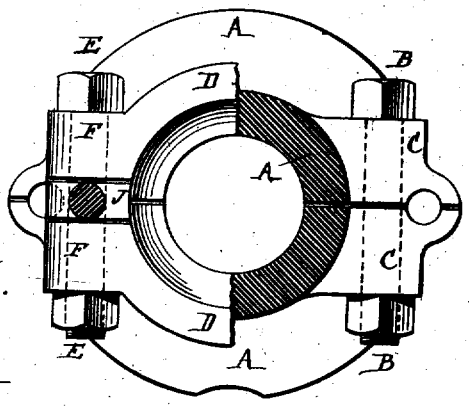
Figure 5:
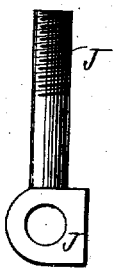

Figure 1 is an end elevation of our improvement. Fig. 2 is a sectional side elevation of the same, taken through the line *x x*, Fig. 1. Fig. 3 is a plan view of the gland. Fig. 4 is a sectional plan view of the stuffing-box, taken through the broken line *y y*, Fig. 2. Fig. 5 is a side elevation of one of the gland-fastening bolts.

We will describe our improvement as applied to the heads of steam rock-drills, but do not limit ourselves to that use, as it can be applied with equal advantage in various other places where there is too little space for the convenient removal of the ordinary gland.

A represents the head, which is made in two parts secured to each other by transverse bolts B, passing through lugs C, formed upon the said head A. The parts of the stuffing-box D, which is formed upon the said head A, are also secured to each other by bolts E, passing transversely through lugs F, formed upon the outer side of the upper edge of the said stuffing-box D. The inner surface of the sides of the stuffing-box D is made smooth and the outer end of the same enlarged, so as to form a guide for the gland G, the outer surface of which is made smooth to fit the inner surface of the enlarged part of the stuffing-box D. The gland G is made in two parts, and with a rim or flange, H, around its upper edge, the ends of the semicircular parts of which project and are halved to each other to form overlapping lugs I. The overlapping lugs I are perforated for the longitudinal bolts J, the heads of which fit into spaces formed by recessing the adjacent ends of the lugs F, the said heads being so formed as to serve as parts of the said lugs, as shown in Figs. 2 and 4. The heads of the bolts J are perforated to receive the bolts E, by which the said bolts J are secured in place and held against the pull of their nuts K as the said nuts are screwed down to draw the gland G into the stuffing-box D and compress the packing-rings, one or more of which can be used, as may be desired, but which are not shown in the drawings. When the stuffing-box D is to be repacked, the nuts K are screwed off, the split gland G is raised off the bolts J, and the said bolts are turned down out of the way, leaving the mouth of the stuffing-box D wholly unobstructed, so that the worn packing can be readily taken out and new packing inserted. With this construction there are no screw-threads upon the stuffing-box or gland to become worn and thus loosen the gland and prevent it from holding the packing under the necessary compression, and should the threads of the bolts J become worn the said worn bolts can be readily replaced with new ones at trifling expense.

Having thus described our invention, we claim as new and desire to secure by Letters Patent—

1. The combination of a stuffing-box, a split gland made of two transversely-connected parts, and screw-bolts for securing the gland to the stuffing-box, substantially as set forth.

2. The combination of a stuffing-box provided with an enlarged end for the packing and gland, a gland made of two transversely-connected parts and provided with a circumferential rim or flange, and screw-bolts by which the rim or flange of said gland is connected with the stuffing-box, substantially as set forth.

3. The combination of a stuffing-box made in two parts, transverse bolts for connecting said parts, a split gland made of two transversely-connected parts, and screw-bolts for connecting the stuffing-box to the gland, substantially as set forth.

4. The combination of a stuffing-box made in two parts, transverse bolts for connecting the said parts, a split gland made of two transversely-connected parts, and screw-bolt pivoted to the transverse bolts of the stuffing-box and adapted to secure the gland to the same, substantially as set forth.

5. In a stuffing-box, the combination, with the stuffing-box D, made in two parts with smooth inner surface, and provided with bolts E and recessed lugs F, of the gland G, made in two parts with smooth outer surface and provided with overlapping perforated lugs I, and the bolts and nuts J K, substantially as herein shown and described, whereby the said gland will be held securely in place and can be readily applied and removed, as set forth.

6. In a stuffing-box, the gland G, made in two parts with smooth outer surface and provided with perforated overlapping lugs I, substantially as herein shown and described, to adapt it to be secured in the stuffing-box by exterior bolts and nuts, as set forth.

In testimony that we claim the foregoing as our invention we have signed our names in presence of two subscribing witnesses.

WILLIAM DINGLE.
WILLIAM JENKINS.

Witnesses as to William Dingle:
WILLIAM S. HARRIS,
JOHN H. PHILLIPS.
Witnesses as to William Jenkins:
PAUL GOEPEL,
CARL KARP.